United States Patent Office 3,445,415
Patented May 20, 1969

3,445,415
METHOD FOR MAKING ORGANIC LATEXES
Joseph Cekada, Jr., and Donald R. Weyenberg, Midland, Mich., assignors to Dow Corning Corporation, Midland, Mich., a corporation of Michigan
No Drawing. Filed Dec. 9, 1965, Ser. No. 512,769
Int. Cl. C08f 1/74, 35/02
U.S. Cl. 260—29.6            10 Claims

ABSTRACT OF THE DISCLOSURE

A method for making organic latexes employing silsesquioxanes as polymerization seeds is disclosed.

---

This invention relates to a method for making organic latexes. More specifically this invention relates to a method for making organic latexes employing silsesquioxanes as polymerization seeds.

The polymerization of organic monomers in aqueous emulsion to form organic latexes is now a well-established practice, especially in the production of elastomers. Sometimes in such polymerization a colloidal suspension is used as the polymerization medium and the colloidal particles can serve as the site for the polymerization of the organic monomer. In these cases, the initial colloidal suspension is referred to as the "seed" emulsion. It is an object of this invention to provide a new method for making organic latexes employing silsesquioxanes as polymerization seeds. The process of this invention can be used to prepare resinous, plastic or elastomeric polymers in emulsion. The polymers so produced can be used for any of the many well-known purposes described numerous places elsewhere in the literature.

The process of this invention is particularly useful in that it provides a means whereby organic latexes can be produced wherein the particles are generally smaller in size than those made by previously known methods, and wherein the particles are often less than 1000 A. in size. Such small particle size organic latexes are of particular use for the preparation of coalesced, hard organic polymers. Many organic polymers are difficult or impossible to coalesce when the particle size increases. These small particle size organic latexes are also useful as fillers for organic and silicone polymers, especially organic and silicone elastomers. The organic latexes produced in accordance with the method of this invention are also useful for the treatment of fibrous materials to impart special properties thereto. The fibrous materials can be natural or synthetic in origin, and can be in such various states as filaments, fibers, fabrics and carpeting. Specific examples of the types of materials that can be treated are wool, silk, jute, flax, cotton, asbestos, rayon, nylon, acrylics, polyacrylonitrile, polyvinylidene chloride, polyesters, cellulose acetate, glass and mixtures or blends thereof.

Briefly described, the process of this invention involves the addition of an organic monomer to a colloidal suspension or emulsion of a silsesquioxane having a particle size in the range of 10 to 1000 A., under conditions which cause the polymerization of the organic monomer.

The colloidal suspension of the silsesquioxane used in the process of this invention can be prepared, for example, by adding a silane having the formula $RSi(OR'')_3$, wherein R is a monovalent radical selected from the group consisting of hydrocarbon radicals containing 1 to 5 carbon atoms, halohydrocarbon radicals containing 1 to 5 carbon atoms and the phenyl radicals, and R" is selected from the group consisting of the hydrogen atom, alkyl radicals containing 1 to 4 carbon atoms and the

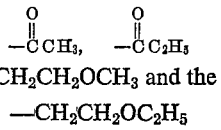

$-CH_2CH_2OH$, $-CH_2CH_2OCH_3$ and the
$-CH_2CH_2OC_2H_5$ groups, to a water-surfactant mixture, with agitation, under acidic or basic conditions. The surfactant must be either anionic or cationic in nature as defined in the application identified below. The amount of silane employed should be less than about 10% by weight based on the combined weights of the silane, water and surfactant although up to about 35% by weight of silane can be employed if it is added to the water-surfactant mixture at the rate of less than one mol of silane per hour. A more detailed description of how the colloidal suspensions of the silsesquioxanes can be prepared is found in abandoned U.S. patent application Ser. No. 427,077, filed Jan. 21, 1965 by Joseph Cekada, Jr., and Donald R. Weyenberg and entitled, "Colloidal Silsesquioxanes and Methods for Making Same"; the disclosure of which is incorporated herein by reference.

If the colloidal suspension of the silsesquioxane is acidic or basic after its preparation, it can be neutralized with a suitable material such as hydrochloric acid, acetic acid, ammonium hydroxide, sodium hydroxide or sodium bicarbonate. Ammonium hydroxide is preferred for neutralizing acidic suspensions since they are somewhat sensitive to the sodium ions and can even be broken by them if the neutralization is not carefully done. In some instances, this neutralization will be essential since the polymerization of some organic monomers cannot be carried out under acidic or basic conditions. An example is the acrylates which must be polymerized under neutral conditions. Of course, there are other organic monomers which must or should be polymerized under acidic or basic conditions. The necessary and ideal polymerization conditions for the organic monomers that can be polymerized by the process of this invention are well know to those skilled in the art, and this will determine whether the colloidal suspension of the silsesquioxane employed is acidic, basic or neutral.

To the colloidal suspension of the silsesquioxane, a free radical catalyst and an organic monomer are added and then the suspensions heated to the activation temperature of the catalyst. Other than this heating, and agitation of course, there are no critical limitations on the process so far as is known at this time.

Specific examples of suitable free radical catalysts that can be employed herein are the inorganic peroxides such as hydrogen peroxide, ammonium persulfate, potassium persulfate and the like; the various organic peroxy catalysts, such as the dialkyl peroxides, e.g., diethyl peroxide, diisopropyl peroxide, dilauryl peroxide, dioleyl peroxide, distearyl peroxide, di - (tertiary - butyl)peroxide, di - (tertiary amyl) peroxide, dicumyl peroxide and the like; the alkyl hydrogen peroxides such as tertiary butyl hydroperoxide, tertiary amyl hydroperoxide, cumene hydroperoxide, tetralin hydroperoxide, the diisopropyl benzene hydroperoxide and the like; the symmetrical diacyl peroxides, for instance acetyl peroxide,
propionyl peroxide,
lauroyl peroxide,
stearoyl peroxide, malonyl peroxide,
succinoyl peroxide,
phthaloyl peroxide,
benzoyl peroxide;

ketone peroxides such as methylethyl ketone peroxide, cyclohexanone peroxide, and the like; the fatty oil acid peroxides, such as cocoanut oil acid peroxides and the like; the unsymmetrical or mixed diacyl peroxides, such as acetyl benzoyl peroxide, propionyl benzoyl peroxide and the like; the azo compounds such as 2-azobis(isobutyronitrile),
2-azobis(2-methylbutyronitrile),
1-azobis(1-cyclohexancarbonitrile)

and the like and other free radical generating catalysts such as the disulfides.

All of the catalyst can be added initially, or it can be added incrementally or continuously as may best suit the particular reaction. The amount of catalyst employed is not critical, within reason, so long as enough is used to promote the polymerization of the organic monomer.

To the colloidal silsesquioxane suspension containing the free radical catalyst the organic monomer is added with agitation. The monomer can be added as the catalyst above, that is, in one shot, in increments or continuously as may be determined best suited to individual needs and polymerization techniques for individual polymers. The amount of organic monomer to be added is, of course, of importance too.

The organic monomers that can be employed herein are well-known materials, are readily available, and are defined as having one or more polymerizable unsaturated carbon-to-carbon bond. Examples of such materials include vinyl, vinylidene and allyl aromatic compounds such as styrene,
the vinyl toluenes,
the methyl styrenes,
the ethyl styrenes,
the propyl styrenes,
the vinyl biphenyls,
the vinyl biphenyl ethers,
the vinyl naphthalenes,
and the like;
the substituted vinyl, allyl or vinylidene aromatics including the alkyl, phenyl, alkoxy, phenoxy, acetyl, acylamino, isocyanate, carbamide, amido, amino, nitrile, carboxyamido, trifluoromethyl, phosphoro, and halo (F, Cl, Br) substituents including the mono, di, tri and tetra substituted styrenes, methyl styrenes, ethyl styrenes, isopropyl styrenes and the like monomers; esters of olefinic acids including α and β substituted olefinic acids and including alkyl, cycloalkyl, alkenyl, aryl, aralkyl esters such as the methyl, ethyl, propyl, butyl, isobutyl, pentyl, hexyl, cyclohexyl, phenyl esters of acrylic, methacrylic, ethacrylic, and the like; and including the α-haloacrylates such as methyl α-chloroacrylate, propyl α-chloroacrylate and the like; the esters of olefinic alcohols with saturated acids, such as allyl,
methallyl,
crotyl,
1-chloroallyl,
2-chloroallyl, vinyl, methylvinyl, and the like esters of saturated aliphatic and aromatic monobasic acids as vinyl and allyl acetate, isopropenyl acetate, vinyl formate, vinyl 2-ethylhexoate, methyl vinyl acetate, vinyl and allyl propionate, vinyl and allyl benzoate, and the like; the vinylalkyl esters of olefinic dicarboxylic acids such as the vinyl alkyl esters from such alkyls as methyl, ethyl, propyl, and the like through $C_5$, of the olefinic dicarboxylic acids including maleic, citraconic, itaconic, muconic, glutaconic, fumaric and derivatives of these esters such as vinyl ethyl-chloromaleate and the like; olefinic acid esters of epoxy alcohols, such as 2,3-epoxypropyl methacrylate or acrylate,
glycidyl methacrylate,
glycidyl acrylate,
glycidyl crotonate, benzene vinyl monoepoxide and the reaction products of such with amines, as trimethyl amide and the like; the olefinic halides, such as vinyl fluoride, vinyl chloride, vinyl bromide, vinylidene fluoride, vinylidene chloride and the like; the alkenyl ketones such as methyl vinyl ketone, isopropenyl methyl ketone and the like; the olefinic ethers such as vinyl ethyl ether, vinyl butyl ether, vinyl cyclohexyl ether, vinyl phenyl ether, vinyl tolyl ether, vinyl benzyl ether and the like; the olefinic aldehydes such as acrolein, methacrolein, and the like; the amino olefinic ethers such as the amino vinyl ethers including aminoethylvinyl ether,
aminopropylvinyl ether,
N-methylaminoethylvinyl ether,
N,N-diethylaminoethylvinyl ether and the like;
nitrogen containing esters of olefinic acids such as
aminocyclohexyl methacrylate,
triethanolamine monomethacrylate,
β-piperidyl-N-ethyl methacrylate,
β-morpholine-N-ethyl methacrylate,
N-methacrylyl morpholine,
N-methacrylyl thiomorpholine,
N-methacrylyl piperidines,
N-acrylyl morpholine,
N-acrylyl thiomorpholine,
N-acrylyl piperidine and the like;

the quaternary ammonium monomers, including methacryloxyethyltrimethylammonium methylsulfate and various quaternizing reaction products of quaternizing agents such as alkyl halides, alkyl sulfonates, alkyl phosphates and the like (e.g., methyl bromide and toluene sulfonate) with tertiary amine monomers such as β-dimethylaminoethyl methacrylate,
methyl-α-diethyl aminoacrylate,
methyl-α-(N-methylanilino)-acrylate,
methyl α-dibenzylaminoacrylate,
methyl α-distearyl amino acrylate and the like;

the monoolefinic triazine monomers including triazine monomers in which one of the carbons of the triazine ring is attached to a vinyl, allyl radical or the like and the other carbons of the triazine are attached to cyano, halo (F, Cl, Br), amino, alkoxy, cycloaliphatic (e.g., cyclopentyl, cyclohexyl, etc.) aromatic-substituted (e.g., phenyl, biphenyl, naphthyl, etc.) alkylaryl (e.g., tolyl, xylyl, ethylphenyl, etc.) halogenated aromatic and the like; the N-vinyl-N-alkyl-guanidines such as N-vinyl-N-n-butylguanidine,
N-vinyl-N-benzyl guanidine,
acryloguanamine,
methacryloguanamine and the like;
the N-vinyl monomers such as N-vinylpyrrole,
N-vinyl carbazole,
N-vinylindole,
N-vinyl succinimide and the like;
N-vinyl lactams such as N-vinyl caprolactam,
N-vinyl butyrolactam and the like;

the amides and substituted amides of acrylic acid and α- and β-substituted acrylic acids such as acrylamide,
methacrylamide,
ethacrylamide,
N-methacrylamide,
N-methylmethacrylamide,
N,N-bis(hydroxyethyl)acrylamide, N,N-diethylacrylamide, N,N - ethylmethylacrylamide and other mono- and di-N-substituted unsaturated acid amides where the substituent is alkyl $C_1$ to $C_5$ alkyl, alkoxy, haloalkyl and the like; the olefinic nitriles such as acrylonitrile, methacrylonitrile, ethacrylonitrile, chloroacrylonitrile and the like; the fluoro-substituted nitriles of olefinic acids such as N-(2,2,3-trifluoroethyl)acrylamide,
methacrylamide,
N-(2,2-difluoroethyl)acrylamide and methacrylamide;

the acylamino substituted acrylic and α- and β-acrylic acid esters such as the methyl, ethyl, propyl and the like alkyl esters of α-acetoaminoacrylate, α-N-butyraminoacrylate and the like; the vinyl pyridines such as 2-vinylpyridine,
3-vinylpyridine,
4-vinylpyridine,
2-vinyl-5-ethyl pyridine, 2-methyl-5-vinylpyridine and the other ethyl and methyl isomers of vinylpyridine and the like; the vinyl heterocyclic compounds such as 2 - vinylfuran and 2 - vinylthiophene and the like; the phosphorus containing monomer such as acrylic esters containing phosphonamido groups such as diamidophosphoroacrylate and the like and other similar polymerizable materials having a polymerizable unsaturated carbon-to-carbon bond.

The conjugated dienes include the following: hydrocarbon conjugated dienes such as butadiene-1,3, isoprene, 2,3-dimethylbutadiene-1,4, piperylene, pentadiene-1,3, 2-phenyl butadiene-1,3, and the like; the polar conjugated dienes such as 1- and 2-cyanobutadiene-1,3, 2-chlorobutadiene-1,3 and the like.

Monomer material having a plurality of polymerizable unsaturated carbon-to-carbon bonds at least two of which are non-conjugated, and include: the polyunsaturated esters of olefinic alcohols and unsaturated monocarboxylic acids such as the vinyl, vinylidene, and allyl esters of unsaturated monocarboxylic acids such as vinyl acrylate, allyl acrylate, the vinyl and allyl esters of α- and β-substituted acrylates such as vinyl methacrylate, vinyl crotonate, vinyl ethacrylate, allyl methacrylate, allyl ethacrylate, vinyl-α-chloroacrylate, allyl-α-hydroxyethyl acrylate, and the like; the polyunsaturated esters of saturated dicarboxylic and polycarboxylic acids such as the vinyl, vinylidene, allyl esters and mixed esters of such dicarboxylic acids as oxalic, malonic, succinic, glutaric, adipic, tartaric, citric, and the like; polyunsaturated esters of unsaturated polycarboxylic acids, such as the vinyl, vinylidene, and allyl esters and mixed esters of the unsaturated polycarboxylic acids such as maleic, citroconic, itaconic, mesaconic, fumaric, muconic chloromaleic, aconitic and the like including such monomers as diallyl fumarate, diallyl homophthalate, diallyl itaconic, diallyl ester of muconic acid, diallyl maleate, diallyl phthalate, diallyl isophthalate, diallyl terephthalate, and the like; polyhydroxy esters of unsaturated acids such as the glycol esters, glycol ether esters, the trihydroxy-, tetrahydroxy-, pentahydroxy-, hexahydroxy- esters including the glycerides, the pentoses, the hexose esters of acrylic acid and α- and β-substituted acrylic acid such as ethylene diacrylate, ethylene dimethacrylate, propylene dimethacrylate, glycerol dimethacrylate, glyceryl trimethacrylate, tetramethylene diacrylate and dimethacrylate, tetraethylene glycol dimethacrylate and the like; polyunsaturated acid amides such as N,N - diallyl acrylamide, N,N - diallyl methacrylamide, N,N - methylene bisacrylamide and the like; polyunsaturated ethers such as divinyl ether, diallyl ether, divinyl carbitol, divinyl ether of diethylene glycol and the like; polyunsaturated triazines, the diallyl cyanurates, triallyl cyanurate, the di- and tri-vinyl cyanurates and derivatives of these and the like; the polyalkene aryl compounds and derivatives including the polyvinyl-, polyvinylidene- and polyallyl aryl compounds, such as divinylbenzene, trivinylbenzene, divinyltoluene, trivinyltoluene, divinylxylene, divinyl ethylbenzene, divinylbiphenyl and divinylbiphenyl oxide, divinylnaphthalenes, divinyl methylnaphthalenes, and derivatives of these including those with alkyl, alkoxy, phenoxy, acetyl, isocyano, amino, nitrile, trifluoromethyl, and halo (F, Cl, Br) groups and the like; and other monomers containing a plurality of vinyl, vinylidene, allyl, alkenyl and other polymerizable unsaturated double and triple bonds.

Now in order that those skilled in the art may better understand how the present invention can be practiced, the following examples are given by way of illustration and not by way of limitation. All parts and percents referred to are on a weight basis unless otherwise specified.

Example 1

A neutral 5.5% emulsion of $CH_3SiO_{3/2}$ having a particle size of about 125 A. was made by rapidly mixing 89.5% distilled water, 0.5% dodecylbenzene sulfonic acid and 10% $CH_3Si(OCH_3)_3$. After mixing for 5 hours, the emulsion was neutralized with $NH_4OH$.

100 g. of the above silsesquioxane emulsion was placed in a 500 ml. flask equipped with a condenser, stirrer, thermometer and addition funnel, heated to 70°–75° C. and then purged with nitrogen. After purging, 5 g. of a 30% hydrogen peroxide was added and 20 minutes later 11 g. of methylmethacrylate was added. The emulsion was heated for 25 minutes at 85° C., 2 g. more of the hydrogen peroxide added, and then heating continued for another 30 minutes to complete polymerization of the acrylate monomer. Examination of the emulsion by nuclear magnetic resonance indicated no acrylate monomer was present.

Example 2

To a 500 ml. flask, equipped as above, there was added 100 g. of a neutral colloidal suspension of $CH_3SiO_{3/2}$ having a particle size in the range of 10 to 1000 A., there being about 5.5% silsesquioxane solids in the suspension. Nitrogen purging and agitation of the flask contents was started, the suspension heated to 70°–75° C., then 0.4 g. of 30% hydrogen peroxide was added, and then 11 g. of ethylacrylate was added dropwise from the addition funnel over a period of 20 minutes. Upon completion of the acrylate addition, the flask contents were heated at 80° C. for another 30 minutes. A bluish-clear emulsion was obtained which contained about 14.6% solids, 61.5% of these solids being polyethylacrylate and 38.5% being $CH_3SiO_{3/2}$. The clarity of the emulsion indicated that the size of the particles was below 1000 A.

Example 3

200 g. of the methylsilsesquioxane emulsion prepared in Example 1 was placed in a 500 ml. flask, equipped as above, and heated to 70°–75° C. After purging with nitrogen, 1 g. of a 30% hydrogen peroxide solution was added, and 25 minutes later 11 g. of ethylacrylate was added. The emulsion was heated at 80°–90° C. for 40 minutes after which time the emulsion was bluish-clear in color and contained about 10% solids, the organic monomer having been polymerized.

Example 4

100 g. of a neutral 3.5% emulsion of a phenyl silsesquioxane having a particle size in the range of 10 to 1000 A. was placed in a 500 ml. flask, equipped as above, and heated to 80° C. After purging with nitrogen, 0.7 g. of a 30% hydrogen peroxide solution was added, and 20 minutes later 7 g. of ethyl acrylate was added. Heating of the emulsion at 70°–80° C. was continued for 30 minutes after which time polymerization of the acrylate monomer was essentially complete.

Example 5

In a 500 ml. flask, equipped as above, 100 g. of the methyl silsesquioxane emulsion of Example 1 was heated to 80°–85° C. while purging with nitrogen. Then 4 drops of a 30% hydrogen peroxide solution was added and 15 minutes later 5.5 g. of methyl methacrylate was added. Heating at 80° C. was continued for 1 hour. A bluish-clear emulsion of polymethyl methacrylate having a particle size of about 125 A. was obtained.

Example 6

200 g. of the methyl silsesquioxane emulsion of Example 1 was placed in a 500 ml. flask, equipped as above, and heated to 70°–75° C. while purging with nitrogen. Then 0.74 g. of a 30% hydrogen peroxide solution was added followed 25 minutes later by the addition of 11 g. of styrene. Heating was continued for 2 hours at 70°–80° C. A white emulsion of polystyrene was obtained.

Example 7

In a 500 ml. flask, equipped as above, 200 g. of a 3% emulsion of vinyl silsesquioxane having a particle size in the range of 10–1000 A. was heated to 70°–80° C. while purging with nitrogen. Then 0.3 g. of azobisisobutyronitrile was added, and 10 minutes later 6 g. of styrene was added. Heating was continued for 1 hour at 100° C. A white emulsion of polystyrene was obtained.

Example 8

In a 500 ml. flask, equipped as above, 200 g. of the methyl silsesquioxane of Example 1 was heated to 50° C. then 0.066 g. of ammonium persulfate was added as a 1% aqueous solution and then 22 g. of styrene was added. Heating at 50° C. was continued for 16 hours. A white emulsion of polystyrene was obtained.

Example 9

The procedure of Example 8 was repeated except that a nitrogen purge and 44 g. of styrene were used. Essentially identical results were obtained.

Example 10

The procedure of Example 9 was repeated except that 0.132 g. of ammonium persulfate was used and heating was continued for 19 hours after the persulfate and styrene had been added. Essentially identical results were obtained.

Example 11

To a 500 ml. flask, equipped as above, 89.5 g. of distilled water and 0.5 g. of dodecylbenzene sulfonic acid were added. Then 10 g. of vinyltrimethoxysilane were added over a period of about 2 hours to produce a clear emulsion of vinyl silsesquioxane having a particle size in the range of 10–1000 A. The silsesquioxane emulsion was neutralized with $NH_4OH$, the system purged with nitrogen, 5 g. of a 30% hydrogen peroxide solution added, and then the emulsion heated to 50°–60° C. After 15 minutes, 10.6 g. of methyl methacrylate was added, causing the temperature to rise to 82° C. Heating was continued for 3 hours at 60°–70° C. A translucent emulsion of the polymethyl methacrylate was obtained.

Example 12

When the following silsesquioxanes are substituted for the silsesquioxanes of the preceding examples, essentially identical results are obtained:

(A) $C_2H_5SiO_{3/2}$
(B) $C_3H_7SiO_{3/2}$
(C) $C_5H_{11}SiO_{3/2}$
(D) $ClCH_2SiO_{3/2}$
(E) $CF_3CH_2CH_2SiO_{3/2}$
(F) $C_3F_7CH_2CH_2SiO_{3/2}$
(G) A $CH_3SiO_{3/2}$-$C_6H_5SiO_{3/2}$ copolymer
(H) A $CH_3SiO_{3/2}$-$CF_3CH_2CH_2SiO_{3/2}$ copolymer
(I) A $CH_3SiO_{3/2}$-$C_2H_5SiO_{3/2}$ blend

Example 13

When the following organic monomers are substituted for the organic monomers of the preceding examples, essentially identical results are obtained:

(A) Vinyl chloride
(B) Isoprene
(C) Butadiene-styrene mixture
(D) Chloroprene
(E) Vinyl acetate
(F) Vinylidene chloride That which is claimed is:

1. A method for making an organic latex comprising adding at least one organic monomer having one or more polymerizable unsaturated carbon-to-carbon bonds to a colloidal suspension of a silsesquioxane having the unit formula $RSiO_{3/2}$, wherein R is a monovalent radical selected from the group consisting of the methyl, ethyl, propyl, amyl, chloromethyl, 3,3,3-trifluoropropyl, 5,5,5,4,-4,3,3-heptafluoropentyl and the phenyl radicals, said silsesquioxane having a particle size in the range of 10 to 1000 A., said suspension containing a free radical catalyst, and then polymerizing the organic monomer material, said silsesquioxane serving as the site for the polymerization of the organic monomer.

2. The method of claim 1 wherein R is a member selected from the group consisting of the methyl, ethyl, phenyl and 3,3,3-trifluoropropyl radicals and the silsesquioxane has a particle size in the range of 50 to 500 A.

3. The method of claim 2 wherein the organic monomer is an acrylate.

4. The method of claim 3 wherein the organic monomer is ethylacrylate.

5. The method of claim 3 wherein the organic monomer is methyl methacrylate.

6. The method of claim 2 wherein the organic monomer is an alkenylbenzene.

7. The method of claim 6 wherein the organic monomer is styrene.

8. The method of claim 2 wherein the organic monomer is vinyl chloride.

9. The method of claim 2 wherein the organic monomer is isoprene.

10. The method of claim 2 wherein the organic monomer is a butadiene-styrene mixture.

References Cited

UNITED STATES PATENTS

| | | | |
|---|---|---|---|
| 3,355,399 | 11/1967 | Cekada. | |
| 2,965,593 | 12/1960 | Dietz | 260—29.6 |
| 2,909,548 | 10/1959 | Bailey et al. | 260—827 |
| 3,203,919 | 8/1965 | Brachman | 260—29.6 |

FOREIGN PATENTS 242,137 12/1962 Australia.

SAMUEL H. BLECH, Primary Examiner.

H. ROBERTS, Assistant Examiner.

U.S. Cl. X.R.

260—29.2, 29.7, 827